Oct. 10, 1967  G. COANDA  3,345,980
UROMETER
Filed April 20, 1964
FIG. 1.
FIG. 2.
FIG. 3.
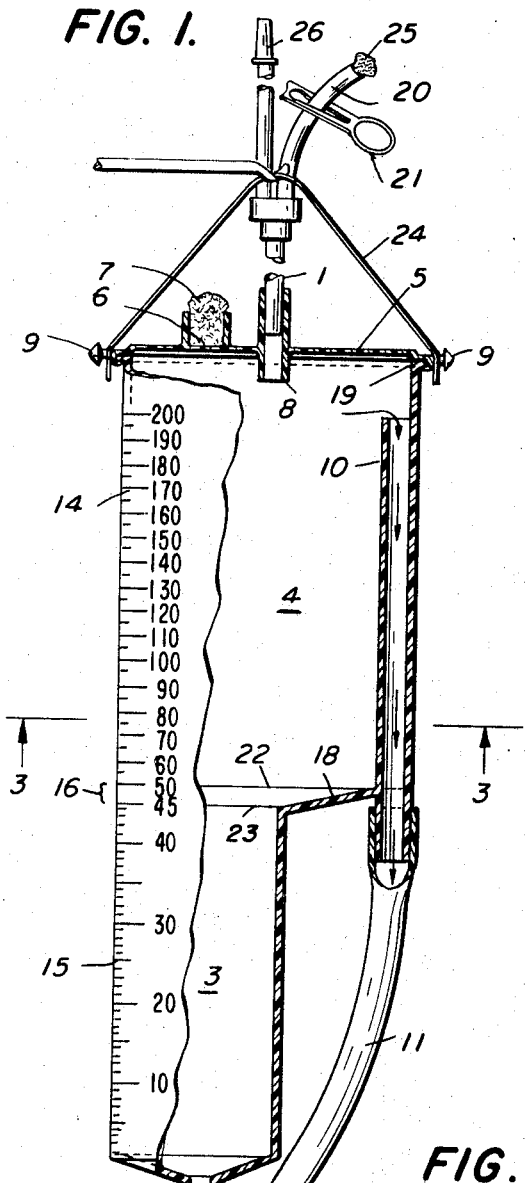
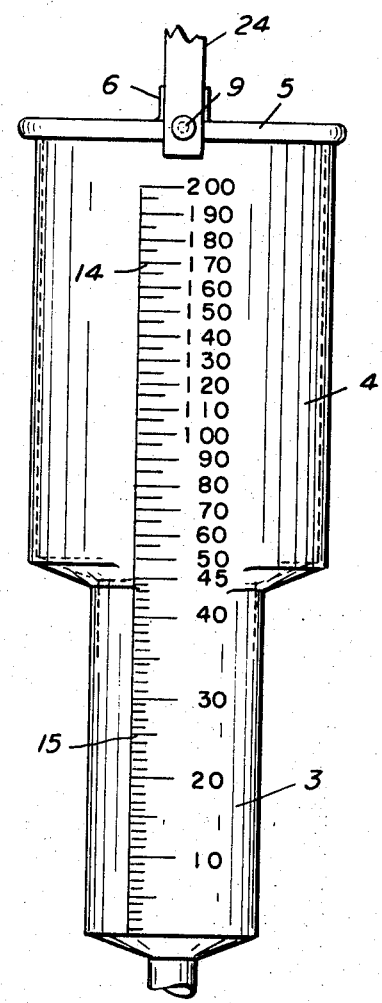
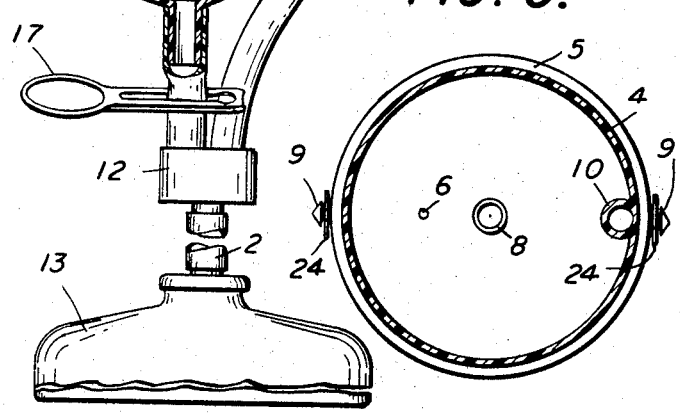
INVENTOR
GEORGE COANDA
BY
Larry N. Barger ns. Station s Patent Office 3,345,980
Patented Oct. 10, 1967

3,345,980
UROMETER
George Coanda, North Hollywood, Calif., assignor to Pharmaseal Laboratories, Glendale, Calif., a corporation of California
Filed Apr. 20, 1964, Ser. No. 361,050
13 Claims. (Cl. 128—2)

ABSTRACT OF THE DISCLOSURE

A urometer for accurately measuring both large and small volumes of urine output, which urometer has a tube for connecting between a patient and an enlarged upper chamber, which upper chamber in turn is integrally joined to a smaller chamber by a common transverse wall. The urometer has a valved outlet opening at a lower end of the smaller chamber and an overflow system for transferring excess urine from the upper chamber to a reservoir below the chambers.

---

This invention relates to a urometer for measuring a wide range of urine output volumes, and which is particularly accurate in the low output volume range.

There has long been a recognized need for measuring the urine output of a patient. A knowledge of the volumes of urine excreted by a patient over particular periods of time is extremely helpful in the management of fluid imbalances or electrolyte abnormalities. In cases where the patient has been in shock and the renal function is questionable, as in severe burn cases, urine output measurement is very important. Also, in virtually any serious illness or injury or operational procedure where a reduction in blood volume is anticipated, accurate measurement of small urinary volume output is either mandatory or highly desirable.

Accurate urine measurements are an aid in recognizing the onset of impending post-surgical shock. For this reason, the urine volumes of many post-surgical patients are measured hourly, particularly those who have undergone cardiac, thoracic, neurological, or genital urinary surgery.

A variety of methods and equipment are now used to obtain these measurements and most of them are makeshift in nature. A urinary drainage tube may be used to pass urine from the urethral catheter to either a plastic collection bag or a glass bottle. Since neither of these provide sufficient accurate calibration readings, the urine has to be poured into an adequate measuring device such as a graduated cylinder, a beaker, or a glass syringe barrel. This is time consuming and disagreeable for the nurse and is poor aseptic technique.

If the patient is excreting very small amounts of urine, the drainage tube may lead directly to a graduated cylinder beaker or measuring cup. However, should the patient suddenly emit an unexpected urinary discharge, the graduated cylinder beaker or measuring cup would very likely overflow onto the floor. Because of the inconvenience of using this makeshift equipment, doctors have been reluctant to prescribe the hourly measurement unless it is absolutely necessary for the patient.

It is an object of this invention to provide a disposable urometer that will accurately measure small volumes of urine output.

Another object of this invention is to provide a disposable urometer that will measure both very small volumes of urine output and normal volumes or urine output.

Another object of this invention is to provide a disposable urometer with which creep contamination along the urinary fluid path into the patient will not occur.

Still another object of this invention is to provide a urometer which measures very small volume outputs, normal volume outputs, and which can accommodate very large and sudden volume outputs.

Still another object of this invention is to provide a disposable urometer with which a nurse can take direct volume readings for each of a series of time intervals without having to subtract an initial volume from a final volume.

Other objects of this invention will become apparent upon further description and the following illustrations:

FIGURE 1 is a side elevational view partially cut away of the urometer;

FIGURE 2 is a front elevational view of the urometer; and

FIGURE 3 is a sectional view taken along line 3—3 of FIGURE 1.

Basically, the urometer is comprised of a conduit means shown as tubes 1 and 2 adapted to lead from a patient to a reservoir 13, and first and second transparent chambers 3 and 4 located along this conduit means with second chamber 4 being located above first chamber 3. This second chamber 4 with calibrations 14 is larger in cross-sectional area than the first chamber 3 with calibrations 15 and both chambers 3 and 4 are larger in cross-sectional area than the conduit means. A bottom 18 of second chamber 4 preferably slopes toward first chamber 3 and connects the two chambers.

Although there may be any transitional zone between the two chambers 3 and 4, it is preferable to have the transition zone 16, including the sloping bottom 18 of the first chamber, designed such that the liquid volume within this zone is an even amount such as 5 cc. or 10 cc. To illustrate, the transitional zone between the two chambers has been designed so first chamber 3 is completely filled at 45 cc. and the sloping bottom 18 of the second chamber 4 is completely covered when 50 cc. are in the urometer. Thus, the nurse reading the urometer would not be confused by the annular juncture lines 22 and 23 at either end of the transition zone because these lines would coincide with definite integer calibration marks, i.e., 45 cc. and 50 cc. The bottom 18 comprises a common wall between chambers 3 and 4 and is annular-shaped as shown in the drawing with respect to the exemplary embodiment.

At the opposite end from transition zone 16, a closure 5 fits over the top of second chamber 4, partially closing the upper end thereof. This closure may be of any type such as screw-on, clamp-on, snap-on, etc. The closure has a passage through its top which terminates in a drip tube 8 extending slightly into the second chamber 4. The opposite end of this passage on the exterior side of the cap connects with a conduit 1 which leads to a urethral catheter inserted into the patient. The closure 5 also includes an air vent 6 which has a filter 7. This filter may be of any material that will pass air but which is impervious to bacteria, such as a wad of cotton.

Preferably, closure 5 can rotate about the upper end of the second chamber 4. Thus, the nurse can rotate chambers 3 and 4 with relation to the closure 5 and point the calibrations in the direction where they are most easily readable. This is easily accomplished with a closure 5 that snaps over a flange 19 around the top of the urometer. Two knobs 9 make closure 5 easy to grab and to rotate. These knobs also connect to a hanging band 24 which supports the urometer.

When the urine reaches a certain level within the second chamber 4, excess urine will flow out through overflow tube 10 down through connecting tube 11, through Y connecter 12, through conduit 2, and into reservoir 13 as shown by the flow arrows. It is important that the top of the overflow tube 10 be spaced below drip tube 8 of closure 5. If the top of overflow tube 10 were higher than drip tube 8, the urine in the filled urometer would back up into conduit 1. Hence, there would be a continuous liquid path between the contents of the urometer and the patient, and creep contamination might occur especially if the urometer were connected to the patient for a considerable time, such as 48 hours.

In setting up the urometer to take a urine volume measurement, the conduit 1 is connected by an adapter 26 to a urethral catheter (not shown) inserted into the patient, and conduit 2 is connected to a reservoir 13. Preferably, this reservoir has an open top covered by a snap-on or screw-on cap, to which conduit 2 connects. This gives an entirely closed urinary collection system and greatly decreases the chance of infection.

Once the urometer is connected, a clamp 17 is closed and urine begins to collect in the first chamber 3. In some patients whose urine output is very small, as for instance 10 cc. or 20 cc. per hour, the entire urine output will be collected in the first chamber 3. At the end of a designated period, such as an hour, the nurse will record the volume and open clamp 17 to drain first chamber 3. Upon closing the clamp 17, urine will again be collected over a second interval of time. As can be seen the urometer is especially suitable for measuring urine volumes over a series of time intervals where the nurse does not have to subtract a starting volume from an ending volume at each interval. With the urometer set up as in FIGURE 1, the total volume of urine output can be measured in reservoir 13 which would have volume calibrations, and the output for each hour is measured in the first chamber 3 or second chamber 4.

If extreme accuracy is required, the conduit 1 can include a bleed line 20 near the urethral catheter. By opening clamp 21 after a collection of urine has been made, air is drawn through filter 25, thereby draining the volume remaining in conduit 1 into first and second chambers 3 and 4, where it is measured. Such a modification would not be needed for a patient with a normal or large output, because the volume in conduit 1 would be very small as compared to the output.

The urometer which I have illustrated and described is extremely versatile. It is capable of very accurately measuring the low volume output of urine in first chamber 3 where the calibrations 15 are in 1 cc. intervals or less. The normal urinary output is measured in the second chamber 4 where the calibrations 14 need be only at 2 cc. or 5 cc. intervals. Very large outputs will overflow through overflow tube 10 into reservoir 13, and will be measured there. After the patient recovers, or urine output measurements are no longer necessary, the urometer, preferably of a transparent plastic such as polystyrene, can be economically discarded after a single use. Such single use eliminates any chance of cross contamination between patients.

In the preferred embodiment of the urometer, first and second chambers 3 and 4 are tangent along one side, as shown in FIGURE 1. Thus, calibrations 14 and 15 can be printed along a smooth flat surface, and these calibrations can be read without parallax which could make the reading erroneous.

While I have described and illustrated a preferred embodiment of my invention, it is understood that those skilled in the art may make certain modifications to this embodiment without departing from the spirit and scope of this invention.

I claim:
1. A urometer comprising:
   (a) a conduit means for connecting to a patient and to a reservoir;
   (b) a first chamber of larger cross-sectional area than said conduit means located along and connected in series with said conduit means;
   (c) a second chamber located along and connected in series with said conduit means above said first chamber, said second chamber having a larger cross-sectional area than said first chamber;
   (d) overflow means associated with an upper portion of said second chamber for carrying excess liquid away from the second chamber; and
   (e) a reservoir connected to said overflow means for receiving said excess liquid.

2. A urometer as set forth in claim 1 wherein said overflow conduit means includes a tube within said second chamber, one end of which is near a top of said second chamber, said tube defining a passage between an interior of said second chamber and an exterior of said second chamber.

3. A urometer comprising:
   (a) a conduit means adapted to lead from a patient to a reservoir;
   (b) a first transparent chamber located along and connected in series with said conduit means, said first transparent chamber having a larger cross-sectional area than said conduit means;
   (c) a second transparent chamber located along and connected in series with said conduit means above said first chamber, said second transparent chamber having a larger cross-sectional area than said first transparent chamber, and including a closure closing off a top of said second chamber, said closure having
      (1) a drip tube extending inside said second chamber; and
      (2) an air vent having a filter which is pervious to air but impervious to bacteria; and
   (d) an overflow outlet near the top of said second chamber but below said drip tube.

4. A urometer as set forth in claim 3 wherein said overflow outlet is adapted to deposit excess liquid from said second chamber into said conduit means at a point below said first chamber.

5. A urometer comprising:
   (a) a conduit means adapted to lead from a patient to a reservoir;
   (b) a first chamber of larger cross-sectional area than said conduit means located along and connected in series with said conduit means;
   (c) a second chamber located along and connected in series with said conduit means above said first chamber, said second chamber having a larger cross-sectional area than said first chamber and including a closure at its top adapted to connect said second chamber to said conduit means, said closure having a drip tube extending into said second chamber, said drip tube defining a passage that is in communication with said conduit means whereby liquid from said patient can flow into said first and second chambers;
   (d) air vent means within a closure, said air vent means having a filter that is pervious to air but impervious to bacteria;
   (e) support means connected to said closure to support said urometer;
   (f) volume calibrations on said urometer from the bottom of said first chamber to a top of said second chamber;
   (g) overflow means connected with said second chamber through which excess liquid may flow, said overflow means connecting with said conduit means at a point below said first chamber and having a port located near the top of said second chamber; and
   (h) a clamp on said conduit means between said first chamber and the point where said overflow means connects to said conduit means, said clamp adapted to start and stop flow through said conduit means.

6. A urometer as set forth in claim 5 wherein said drip tube terminates inside said second chamber at a point above the maximum liquid level in said second chamber as established by said overflow means.

7. A urometer comprising: conduit means for connection to a patient; a pair of integral, different-volume, calibrated upper and lower measuring chambers connected in series, said conduit means being connected to said upper chamber, said lower chamber including a drainage outlet; and means operatively connected to said drainage outlet for selectively stopping drainage through said outlet, said chambers including a common wall therebetween, said common wall generally defining the top of said lower chamber and the bottom of said upper chamber whereby the amounts of urine in the respective calibrated chambers can be readily observed and determined.

8. The structure as claimed in claim 7 in which said common wall comprises an annulus-shaped bottom wall integral with the bottom of said upper chamber.

9. The structure as claimed in claim 8 in which said bottom wall converges from the bottom of said upper chamber toward said lower chamber and terminates at the upper margin of said lower chamber.

10. The structure as claimed in claim 7 in which the upper chamber has a hanger connected to it, which hanger extends above a top end of the upper chamber for suspending the upper and lower chambers from a bed.

11. The structure as claimed in claim 10 in which the hanger extends inwardly from outer edges of the upper chamber towards its center so as to suspend the chambers vertically for accurate measurement of urine volumes.

12. The structure as claimed in claim 11 wherein the hanger extends across the upper chamber directly above the center of gravity of the combined upper and lower chambers when each chamber has its calibrations substantially vertical.

13. The structure as claimed in claim 7 in which the lower chamber is offset to one side of said common wall so the larger upper chamber and the smaller lower chamber have vertically aligned wall portions along which can be placed calibrations for the two chambers.

References Cited
UNITED STATES PATENTS

| | | | |
|---|---|---|---|
| 1,712,848 | 5/1929 | Rose | 128—2 |
| 2,648,981 | 8/1953 | Drake | 128—2 X |
| 3,015,775 | 1/1962 | Coulter et al. | 128—2 X |
| 3,194,069 | 7/1965 | Scott | 73—219 |

RICHARD A. GAUDET, *Primary Examiner.*

SIMON BRODER, *Examiner.*